United States Patent
Tsirkin

(10) Patent No.: US 9,720,712 B2
(45) Date of Patent: Aug. 1, 2017

(54) PHYSICAL/VIRTUAL DEVICE FAILOVER WITH A SHARED BACKEND

(71) Applicant: Red Hat Israel, Ltd., Raanana (IL)

(72) Inventor: Michael Tsirkin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 223 days.

(21) Appl. No.: 13/908,879

(22) Filed: Jun. 3, 2013

(65) Prior Publication Data
US 2014/0359613 A1    Dec. 4, 2014

(51) Int. Cl.
G06F 9/455 (2006.01)
G06F 9/46 (2006.01)
G06F 15/173 (2006.01)
G06F 9/48 (2006.01)
G06F 9/50 (2006.01)
G06F 11/14 (2006.01)

(52) U.S. Cl.
CPC .......... *G06F 9/455* (2013.01); *G06F 9/45533* (2013.01); *G06F 9/45558* (2013.01); *G06F 9/48* (2013.01); *G06F 9/4843* (2013.01); *G06F 9/4856* (2013.01); *G06F 9/4868* (2013.01); *G06F 9/50* (2013.01); *G06F 9/5083* (2013.01); *G06F 9/5088* (2013.01); *G06F 11/1484* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 5,488,716 A | 1/1996 | Schneider et al. | |
| 7,743,389 B2 | 6/2010 | Mahalingam et al. | |
| 7,865,893 B1* | 1/2011 | Omelyanchuk et al. | 718/1 |
| 7,917,811 B2 | 3/2011 | Yamamoto | |
| 7,945,436 B2 | 5/2011 | Ang et al. | |
| 2005/0193273 A1* | 9/2005 | Burkey | 714/42 |

(Continued)

OTHER PUBLICATIONS

Zhai et al, "Live Migration with Pass-Through Device for Linux VM", Proceedings of the Linux Symposium, vol. 2, Jul. 2008, pp. 261-267.*

(Continued)

*Primary Examiner* — Charles Swift
(74) *Attorney, Agent, or Firm* — Lowenstein Sandler LLP

(57) ABSTRACT

The subject matter of this specification can be implemented in, among other things, a method that includes identifying an assigned device that is assigned to a guest operating system of a virtual machine. The method includes transmitting, to the guest operating system, a request indicating a failover event. The failover event involves a switch from the assigned device to an emulated device. The assigned device and the emulated device share a backend physical device. The method further includes receiving an acknowledgement message from the guest operating system that it is ready to switch from the assigned device to the emulated device. The method further includes preventing access to the assigned device by the guest operating system. The method further includes associating a device driver of a hypervisor with the backend physical device and providing a notification to the guest operating system that the emulated device is available for use.

19 Claims, 4 Drawing Sheets

(56) References Cited

U.S. PATENT DOCUMENTS

| | | | |
|---|---|---|---|
| 2007/0204265 A1* | 8/2007 | Oshins | G06F 9/4856 |
| | | | 718/1 |
| 2008/0059556 A1 | 3/2008 | Greenspan et al. | |
| 2008/0307213 A1* | 12/2008 | Sekiguchi et al. | 713/1 |
| 2009/0119087 A1* | 5/2009 | Ang et al. | 703/23 |
| 2009/0125904 A1* | 5/2009 | Nelson | 718/1 |
| 2009/0164990 A1* | 6/2009 | Ben-Yehuda et al. | 718/1 |
| 2010/0250824 A1* | 9/2010 | Belay | 711/6 |
| 2010/0332635 A1* | 12/2010 | Rogel | G06F 9/45533 |
| | | | 709/223 |
| 2011/0119665 A1* | 5/2011 | Santos | G06F 9/45558 |
| | | | 718/1 |
| 2011/0145814 A1* | 6/2011 | Mangione-Smith | 718/1 |
| 2011/0154332 A1 | 6/2011 | Shirae et al. | |
| 2012/0054740 A1* | 3/2012 | Chakraborty et al. | 718/1 |
| 2012/0131575 A1* | 5/2012 | Yehuda | G06F 9/45558 |
| | | | 718/1 |
| 2012/0254866 A1* | 10/2012 | Iwamatsu | G06F 9/45558 |
| | | | 718/1 |
| 2013/0046892 A1 | 2/2013 | Otani | |
| 2013/0311989 A1* | 11/2013 | Ota et al. | 718/1 |

OTHER PUBLICATIONS

Siron, Eric, "Hyper-V Host Failure: How to Prepare", From the Alataro Blog for Hyper-V & Windows Administrators, http://www.altaro.com/hyper-v/hyper-v-host-failure/, Jul. 9, 2012, 7 pages.

* cited by examiner

PHYSICAL/VIRTUAL DEVICE FAILOVER WITH A SHARED BACKEND

TECHNICAL FIELD

Implementations of the present disclosure relate to a computing system, and more specifically, to physical/virtual device failover with a shared backend.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
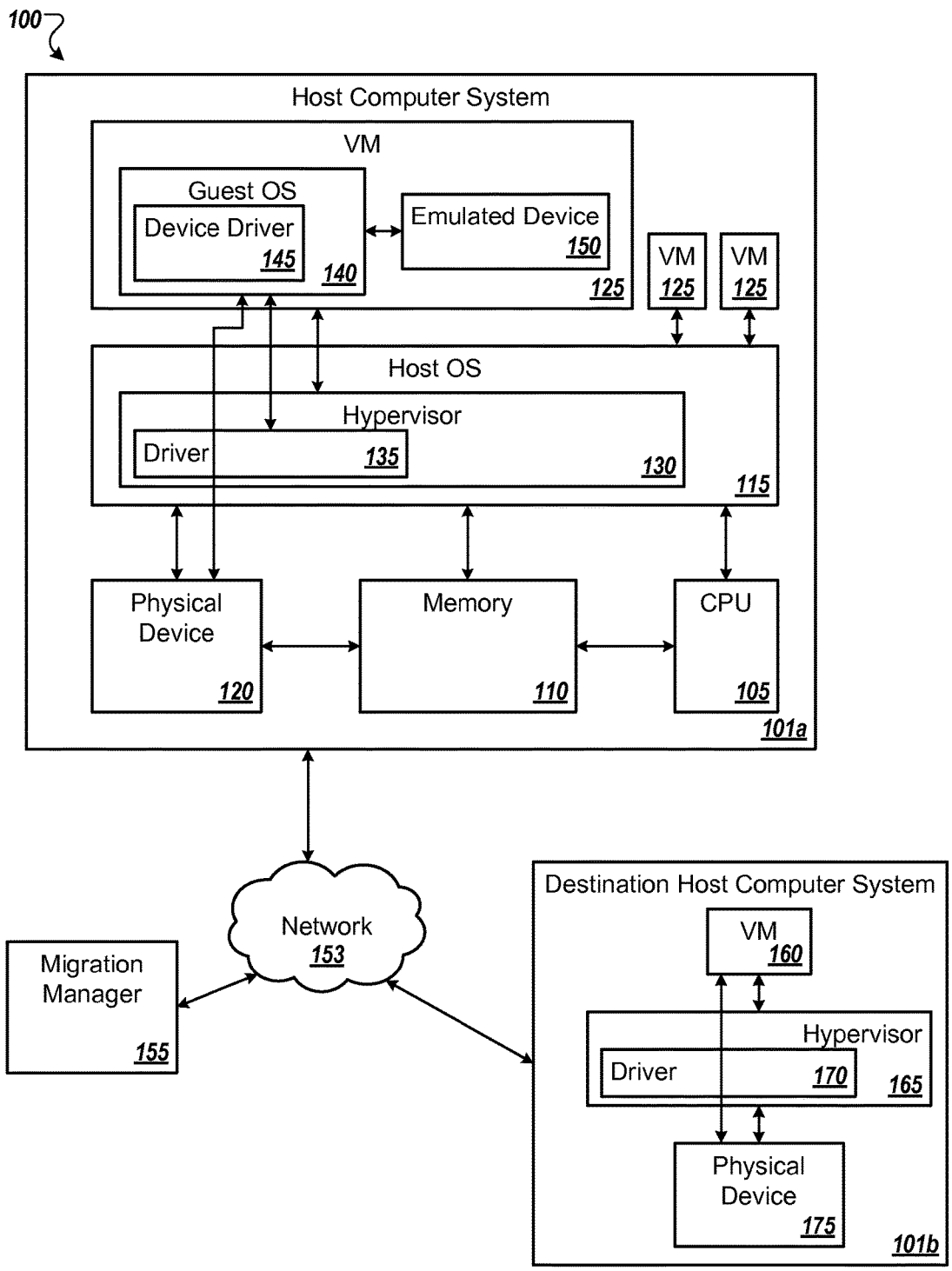
FIG. 1 is a block diagram of a computer system in accordance with some implementations.

The present disclosure pertains to providing a transparent failover between devices of a virtual machine that share a physical backend. A host computer system ("host") provides computing resources (e.g., processing power, memory, storage, input output (I/O) interfaces, devices, etc.) to a virtual machine (VM). The host computer system can use a hypervisor to control the VM's use of the computing resources. The hypervisor can expose devices of the host to the VM. Exposing devices of the host refers to making devices of the host available for use by the VM. Devices of the host can include, for example, storage devices, network devices, graphics devices, system components (e.g., PCI devices, bridges, ports, buses) media devices, (e.g., video cards, sounds cards), etc. The hypervisor can expose devices of the host to a VM via, for example, emulated devices, virtio drivers/devices or assigned devices. Emulated devices are virtual devices within a VM that mimic physical (hardware) devices, allowing guest operating systems to work with the emulated devices using standard in-box drivers. Virtio devices are similar to emulated devices, however, the guest operating system may not include drivers for virtio devices. The hypervisor can cause the guest operating system to install these drivers automatically. An assigned device of a VM is the host's device that can be used by the VM exclusively as set by the hypervisor. Device assignment allows the virtual machine to access the host's device directly or via a hypervisor for a range of tasks, and it allows the virtual machine to perceive the assigned device as if it was attached to the guest operating system. The hypervisor can act as a passthrough for communications between the VM and the host device. Alternatively, the hypervisor can permit the VM to directly communicate with the host device without going through the hypervisor. In a hybrid approach, the hypervisor can act as a passthrough for some communications between the VM and the host device while for other communications, the hypervisor is not involved and the VM communicates with the host device directly. To mitigate any undesirable effects that may occur as a result of a device or operation failure, conventional systems permit multiple physical devices to be configured as a pair in a failover relationship. When one device (e.g., a primary device) experiences an error, for example, operations for that device can be moved (i.e., failed over) to the other device (e.g., a failover device). The device roles then can switch—the failover device becomes the primary device and the primary device becomes the failover device. In existing virtualization systems, the guest OS should be manually configured to connect two devices for the failover relationship.

The different types of devices (emulated, virtio and assigned) can enable different features or configurations for a VM. In particular, resource overcommit can be available for one device type and not for another. Resource overcommit can include allocating more virtualized CPUs or memory to a VM than there are physical resources on the host computer system. In memory overcommit, virtual address space allocated to a VM exceeds the available physical address space in a host computer system. Because, assigned devices involve static memory allocation, resource overcommit may not be available for assigned devices. Similarly, some device types can be used in conjunction with VM migration while others cannot. For example, emulated devices can be used during VM migration while assigned devices cannot because they are not part of the VM being migrated. In contrast, assigned devices can be used to increase performance of the VM.

Aspects of the present disclosure address these shortcomings by having the hypervisor configure failover relationships between devices and then notify the guest OS of the availability of the failover configuration. The hypervisor can then request or cause the guest OS to perform a switch from a primary device to a failover device. In addition, the hypervisor can request or cause the guest OS to perform a switch to add features to the VM or to increase performance of the VM. For example, the hypervisor can request the VM to switch from an assigned device to an emulated device to facilitate VM migration or resource overcommit. In another example, the hypervisor can request the VM to switch from an emulated device to an assigned device for increased performance of the VM (e.g., after VM migration is completed). Accordingly, with aspects of the present disclosure, the guest OS no longer needs to be manually configured to reflect a failover relationship between devices, and the hypervisor can take advantage of the failover relationship to add desired features (e.g., migration capability or resource overcommit capability) to the VM and/or to regulate performance of the VM.

In addition, implementations of the present disclosure can expose multiple device types to the guest OS that share a single backend physical device. The exposed device types can be configured in a failover relationship. As a result, loss of information is less likely to happen because communications reach the backend physical device. Information is preserved because the shared backend can obtain and hold any communications that otherwise would have been lost. Having a single physical device is also beneficial for VM migration because it can reduce the number of devices on both a source host machine and a destination host machine. Further, requests are submitted for execution in the original order which facilitates data correctness for storage devices and improved performance for networking devices.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a migration manager, and the like, including a combination thereof. Further, described herein are techniques for switching between a primary device and a failover device. While examples described herein describe switching between an assigned device and an emulate device, switching between any device, types of devices or between devices of the same type is contemplated.

FIG. 1 is a block diagram that illustrates an example of a host computer system 101 that hosts one or more virtual machines (VM) 125. Each VM 125 runs a guest operating system (OS) 140. The VMs 125 may have the same or different guest operating systems 140, such as Microsoft Windows®, Linux®, Solaris®, Mac®OS, etc. The host computer system 101 may be a server, a workstation, a personal computer (PC), a mobile phone, a palm-sized computing device, a personal digital assistant (PDA), etc.

The host computer system 101 runs a hypervisor 130 to virtualize access to the underlying host hardware, making the use of the VM 125 transparent to the guest OS 140 and a user of the host computer system 101. The hypervisor 130 may also be known as a virtual machine monitor (VMM) or a kernel-based hypervisor. The hypervisor 130 may be part of a host OS 115, run on top of the host OS 115, or run directly on the host hardware without an operating system beneath it.

The host computer system 101 includes hardware components such as one or more physical central processing units (CPUs) 105, memory 110 (also referred to as "host memory" or "physical memory") and other hardware components. In one implementation, the host computer system 101 includes one or more physical devices 120 (also referred to as "physical devices," or "host devices" e.g., audio/video devices, network interface devices, printers, graphics modules, etc.). For simplicity of the illustration, one physical device 120 is shown. It is understood that the host computer system 101 may include any number of devices. The physical device 120 can be any type of device, including a data storage device or mass storage device, such as a magnetic or optical storage based disk, tape or hard drive. Other examples of physical devices 120 include network devices, graphics devices, system components (e.g., PCI devices, bridges, ports, buses) media devices, (e.g., video cards, sounds cards, etc.).

In operation, when the hypervisor 130 assigns a device to a VM 125, it can also indicate that the assigned device needs a companion device for failover. The companion device can be a device that is emulated by the VM 125 (e.g., emulated device 150) that uses the physical device 120 as a backend. The hypervisor 130 can define the failover relationship between the assigned device and the emulated device 150 and can provide a notification to the guest OS 140 that the two devices are available for a failover relationship. If the VM 125 does not have an emulated device that uses physical device 120 as a backend, the hypervisor 130 can instruct the VM 125 to add such a device (e.g., emulated device 150) and can indicate that the assigned device and the emulated device 150 are available and are in a failover relationship. For example, the hypervisor can notify the guest OS 140 that two PCI devices are available—one as an emulated PCI device on a virtual bus and one as an assigned PCI device.

The hypervisor 130 can request that the guest OS 140 use the assigned device. The hypervisor 130 can give the guest OS 140 direct access to the assigned device (physical device 120) such that communications between the guest OS 140 and the assigned device 120 are not routed through the hypervisor 130. In other implementations, communications between the guest OS 140 and the assigned device 120 can pass through the hypervisor 130 and the hypervisor 130 redirects the communications between the assigned device 120 and the guest OS 140 without modifying these modifications (e.g., passthrough). In order for the guest OS 140 to directly access the assigned device 120, the guest OS 140 should have a driver 145 that is specific to the device. 120.

At any time, the hypervisor 130 can transmit to the guest OS 140 a request indicating a failover event. The failover event can involve or trigger a switch from the assigned device to the emulated device 150. The request can be, for example, a hot unplug request, operation failure report, or terminate request. The hypervisor 130 can leverage the failover relationship to enable desired features (e.g., migration capability or resource overcommit capability) to the VM and/or to regulate performance of the VM. The guest OS 140 receives the request and transmits an acknowledge message to the hypervisor 130 to initiate a failover. Once the hypervisor 130 receives the acknowledge message from the guest OS 140, the hypervisor 130 can prevent guest OS 140 from accessing the assigned device (e.g., protect the assigned device from guest OS 140 access). To prevent the guest OS 140 from accessing the assigned device, the hypervisor 130 can update a data structure, such as a page table or an internal hypervisor data structure, with instructions to forward requests intended for the assigned device to the emulated device 150.

Before the guest OS 140 can switch to the emulated device 150, the hypervisor configures the emulated device 150 for use. To configure the emulated device 150, the hypervisor 130 can start or associate a driver 135 in the hypervisor that is specific to the physical device 120. The hypervisor 130 can then expose the emulated device 150 to the guest OS 140. The guest OS 140 can access the emulated device 150 using a generic driver 145 (i.e., a driver that is not specific to the physical device) because the specific driver is handled by the hypervisor 130. Once the emulated device 150 is configured, the hypervisor 130 can provide a notification to the guest OS 140 that the emulated device 150 is available for use. The guest OS 140 can then use the emulated device 150 for regular functionality or special functionality, such as for resource overcommit, migration, and the like. In one implementation, the guest OS 140 has a smart driver 145 that switches between emulated and assigned devices, such as for a failover operation. If the hypervisor 130 identifies an access request or message addressed to the emulated device during the switch (before the switch is completed), the hypervisor 130 can hold the access request or message. Upon receiving a notification that the guest OS 140 is ready to use the emulated device 150, the hypervisor 130 can transmit the access request or message to the emulated device 150. When the guest OS 140 communicates with the emulated device 150 (e.g., to write data to, or read data from the emulated device 150), the hypervisor 130 detects these communications and propagates them to the physical device 120.

To switch from the emulated device 150 to assigned device, the hypervisor 130 can take actions similar to those taken when switching from the assigned device to the emulated device 150. The hypervisor 130 can transmit a switch-back request to the VM. The switch-back request can be in any form, such as a request to unplug the emulated device 150 (e.g., such as when migration is complete), virtual device failure report, or terminate request (e.g., terminate overcommit), etc. The hypervisor 130 can disassociate the device driver 135 in the hypervisor 130 from the backend physical device 120. The hypervisor 130 can expose the assigned device to the guest OS. The hypervisor can also update a data structure, such as a page table or an internal hypervisor data structure, with instructions to forward requests intended for the emulated device 150 to the assigned device. Then, the hypervisor 130 can provide a request to the guest OS 140 to switch to the assigned device. The guest OS 140 can have a driver 145 that is specific to the physical device 120.

In some implementations, hypervisor 130 (e.g., in response to a system administrator request) can initiate a resource overcommit for the VM 125. To facilitate the resource overcommit, the hypervisor 130 can instruct the guest OS 140 to "failover" or switch from the assigned device to the emulated device 150, as described herein. When overcommit is no longer desired, the hypervisor 130 can instruct the guest OS 140 to failover or switch back to the assigned device. In one example, resource overcommit is enabled for execution of a specific program. The hypervisor 130 determines or identifies when the program execution is complete and initiates the switch back to the assigned device.

In another implementation, the hypervisor can initiate the switch in response to a VM migration request. The request can come from a migration manager 155, system administrator, etc. For VM migration, the VM 125 switches to the emulated device 150 using techniques described herein. The VM migration can be to another VM on the same host computer system 101*a* or to another host computer system 101*b* (e.g., a destination host computer system), such as over a network 153. When the VM migration is complete, the hypervisor (on the same host 101*a* or the destination host 101*b*) may instruct the guest OS of the migrated VM to switch to an assigned device (physical device 120 on the same host 101*a* or physical device 180 on the destination host 101*b*). In one implementation, the physical device 180 of the destination computer system 101*b* is the same make and model device as physical device 120 of the source computer system 101*a*. In another implementation, the physical device 120 and the physical device 180 are not the same make and/or model but perform a similar function (e.g., video card, storage device, etc.). When switching from the emulated device 150 to the assigned device 175, the hypervisor 165 can install a driver that is specific for the physical device 180.

In one implementation, the request to switch is a hot unplug request or a terminate request. In another implementation, the request is an operation failure report. For example, if the assigned device and emulated device 150 are networking devices, an operation failure report can indicate that a networking link is broken. To try another link that might work, the guest OS 140 can switch to the emulated device 150. The operation failure report can be for any type of failure for any type of device, such as a read or write error for a storage device, and the like.

Figure 2:
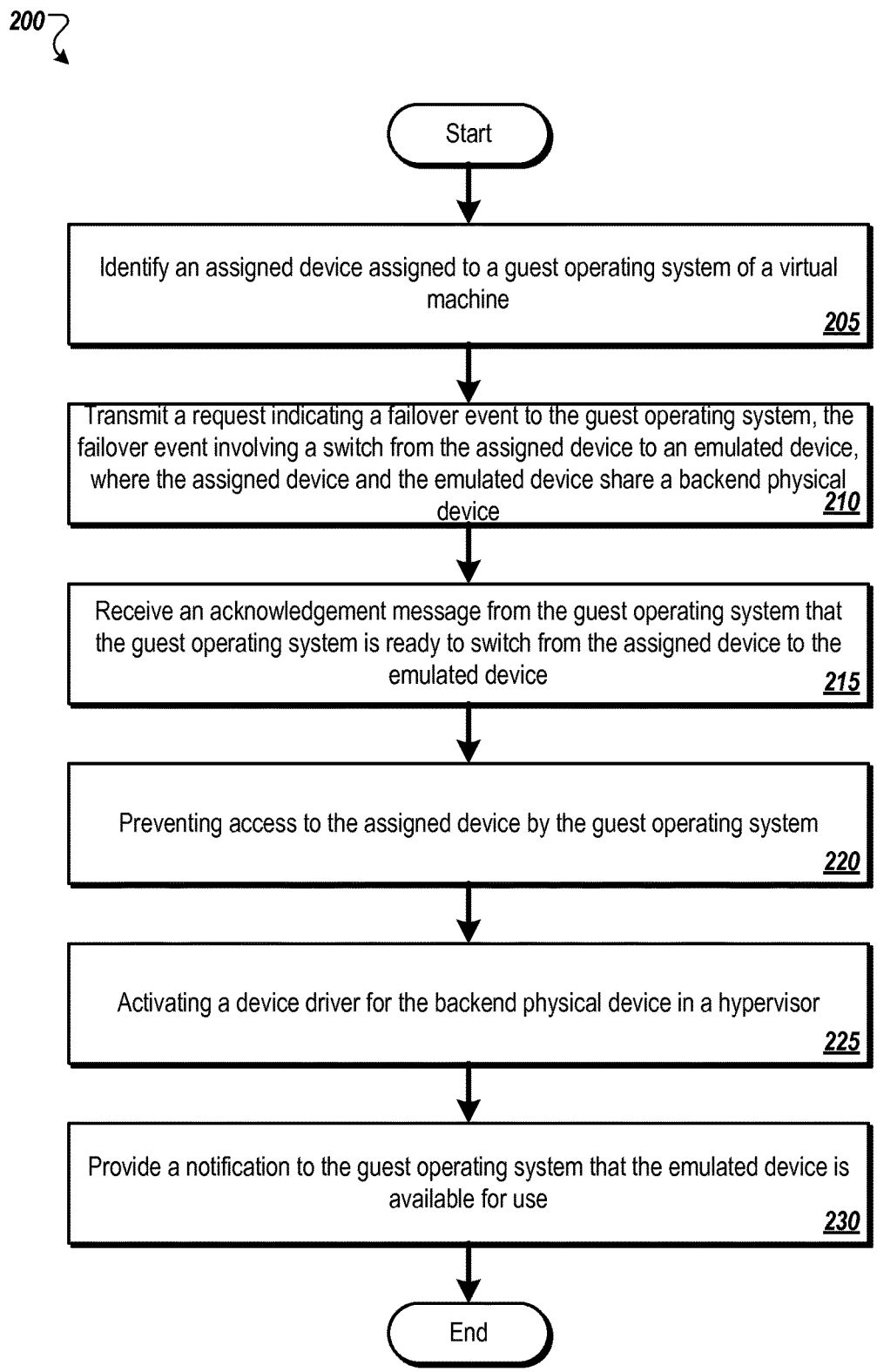
FIG. 2 is a flow diagram of one implementation of a method for switching from an assigned device to an emulated device in accordance with some implementations.

FIG. 2 is a flow diagram of one implementation of a method 200 for switching from an assigned device to an emulated device in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 200 is performed primarily by hypervisor 130 of FIG. 1. For clarity of presentation, the description that follows uses the system 100 as examples for describing the method 200. However, another system, or combination of systems, may be used to perform the method 200.

Referring to FIG. 2, in one implementation, method 200 begins at block 205, with the hypervisor identifying a device assigned to a guest operating system of a virtual machine running on a source computer system. The device can be any type of device, such as a network device, storage device, PCI device, etc. A physical device can be "assigned" to the guest OS to give control of the physical device to the VM. In one implementation, when assigning a device to the VM, the hypervisor exposes the physical device to the guest OS running on the VM without allowing the guest OS to direct access the physical device (the hypervisor acting as a pass-through for communications between the guest OS and the physical device). In another implementation, assigning the device to the guest OS includes permitting the guest OS to directly access the physical device. In yet another implementation, the hypervisor allows the guest OS to directly access the physical device for some communications and acts as a pass-through for others. The hypervisor can also define a failover relationship between the assigned device and an emulated device in the VM, where the assigned device and the emulated device can failover to each other. The assigned device and the emulated device can be the same type of device and can share a backend physical device. When the VM does not have a virtual device that emulates the physical device (a virtual device that uses the physical device as a backend), the hypervisor can instruct the VM to add such emulated device. Once the hypervisor defines the failover relationship between the assigned device and the emulated device, the hypervisor notifies the VM about this relationship. The VM can then acknowledge the failover relationship between the assigned device and the emulated device.

At block 210, the hypervisor identifies a need for the VM to use a different device, and transmits a request indicating a failover event to the guest operating system. The failover event involves a switch from the assigned device to an emulated device. The need for the VM to use an emulated device may arise, for example, to enable VM migration or VM resource overcommit. The request can be in the form of a hot unplug request, an operation failure report, a migration request, or a terminate request.

At block 215, the hypervisor receives an acknowledgement message from the guest OS that the guest OS is ready to switch from the assigned device to the emulated device. At block 220, the hypervisor prevents access to the assigned device by the guest operating system. In one implementation, preventing access to the assigned device by the guest OS includes updating a data structure (e.g., page table, hypervisor data structure, etc.) with instructions to forward requests for the assigned device to the emulated device. In one implementation, if the hypervisor receives an access request or message for the emulated device before the switch to the emulated device is complete, the hypervisor holds the access request or message. Upon receiving a notification that the guest OS is ready to use the emulated device, the hypervisor transmits the access request or message to the emulated device.

At block 225, the hypervisor activates a device driver for the backend physical device. The device driver can be specific to the physical device. Since the hypervisor handles the specific device driver, the guest OS can have a generic driver for the emulated device.

At block 230, the hypervisor provides a notification to the guest OS that the emulated device is available for use. The guest OS can use the emulated device for resource overcommit, as described herein. The guest OS can also use the emulated device for VM migration, as described herein.

Figure 3:
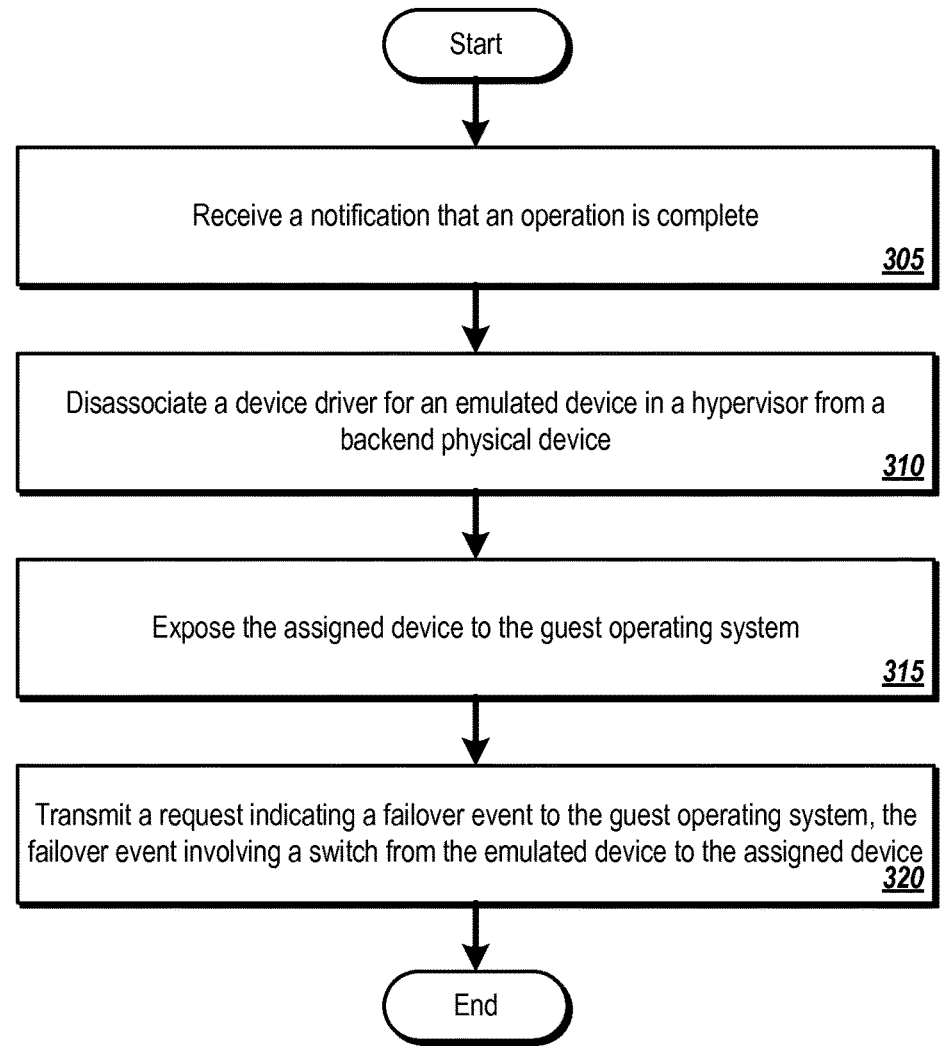
FIG. 3 is a flow diagram of one implementation of a method for switching from an emulated device to an assigned device in accordance with some implementations.

FIG. 3 is a flow diagram of one implementation of a method 300 for switching from an emulated device to an assigned device in accordance with some implementations. Method 300 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 300 is performed primarily by hypervisor 130 of FIG. 1. For clarity of presentation, the description that follows uses the system 100 as examples for describing the method 300. However, another system, or combination of systems, may be used to perform the method 300.

Referring to FIG. 3, in one implementation, method 300 begins at block 305, with the hypervisor determining that a VM should switch from an emulated device to an assigned device. This determination can be made upon detecting that the VM is no longer operating in the resource overcommit mode or the VM migration is complete. The determination can also be made in response to a request from a system administrator, another computer, or another module or component of the same computing system.

At block 310, the hypervisor deactivates a device driver for a backend physical device. At block 315, the hypervisor exposes the assigned device to the guest operating system. The hypervisor can update a data structure, such as a page table or an internal hypervisor data structure, with instructions to forward requests intended for the emulated device to the assigned device. At block 320, the hypervisor transmits a request indicating a failover event to the VM, the failover event involving a switch from the emulated device to the assigned device. The guest OS can now use the assigned device.

Figure 4:
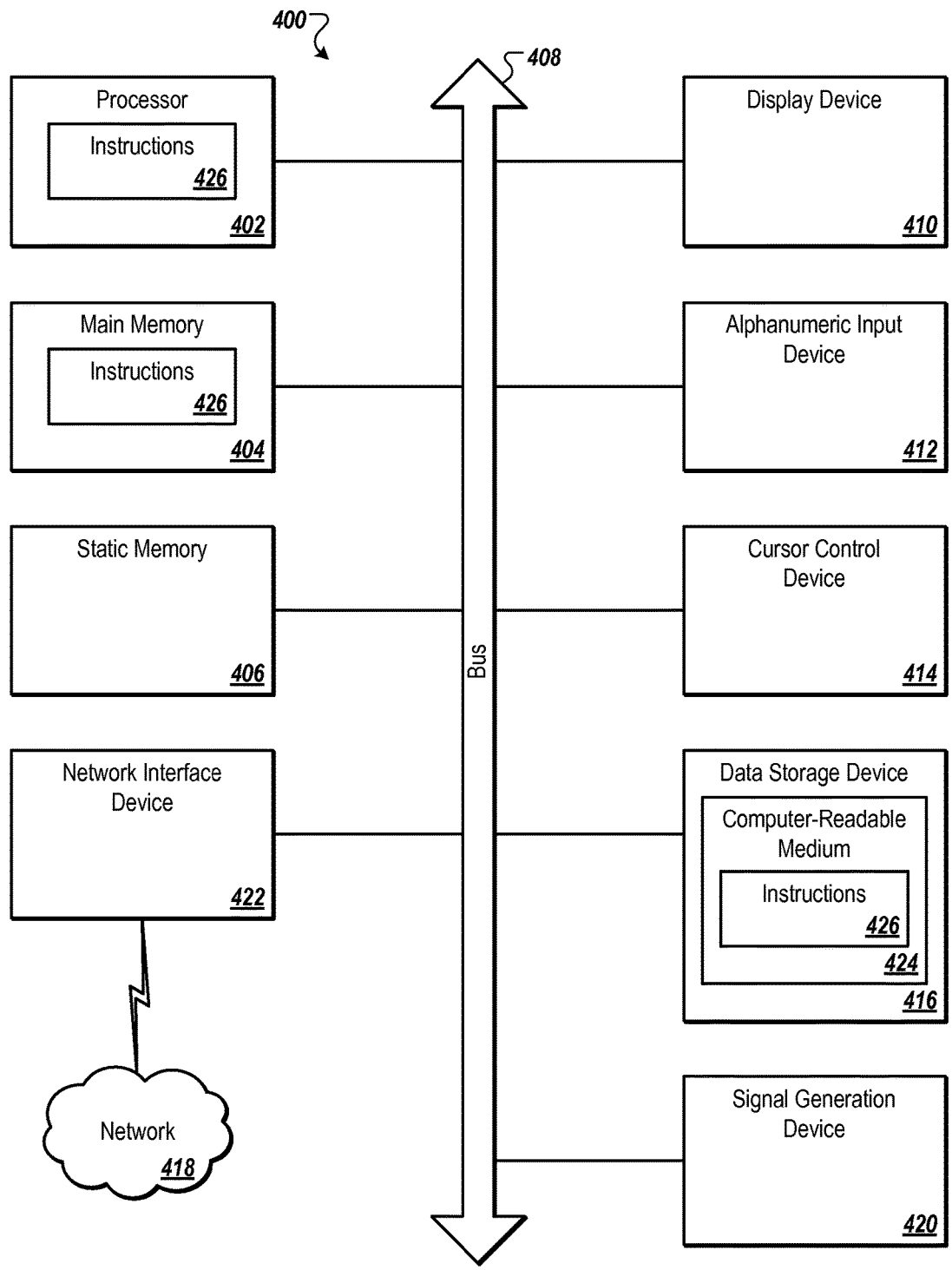
FIG. 4 is a schematic diagram that shows an example of a machine in the form of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the host computer system 101 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the host computer system 101 embodying any one or more of the methodologies or functions described herein. The sets of instructions 426 of the host computer system 101 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting", "transmitting", "receiving", "preventing", "associating", "creating", "permitting", "holding", "dissociating", "exposing", initiating", "identifying", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   identifying, by a processor executing a hypervisor running on a source computer system, an assigned device assigned to a guest operating system of a virtual machine running on the source computer system;
   detecting that the virtual machine does not include an emulated device;
   instructing the virtual machine to add the emulated device;
   notifying the guest operating system that the emulated device is available as a failover for the assigned device;
   transmitting, by the processor executing the hypervisor to the guest operating system, a request indicating a failover event, the failover event involving a switch from the assigned device to the emulated device, wherein the assigned device and the emulated device share a backend physical device;
   receiving an access request for the emulated device before the switch from the assigned device to the emulated device is completed;
   holding, by the processor executing the hypervisor, the access request until the switch from the assigned device to the emulated device is completed;
   receiving, by the processor executing the hypervisor, an acknowledgement message from the guest operating system that the guest operating system is ready to initiate a failover and switch from the assigned device to the emulated device;
   preventing access to the assigned device by the guest operating system;
   transmitting the access request held by the processor executing the hypervisor to the emulated device in response to determining that the switch is completed and that the guest operating system is ready to use the emulated device;
   associating a device driver of the hypervisor with the backend physical device associated with the emulated device; and
   providing, by the processor executing the hypervisor, a notification to the guest operating system that the emulated device is available for use.

2. The method of claim 1, wherein assigning the device to the guest operating system comprises permitting the guest operating system to directly access the backend physical device.

3. The method of claim 1 further comprising defining, by the processor executing the hypervisor, a failover relationship between the assigned device and the emulated device, wherein the assigned device is to failover to the emulated device.

4. The method of claim 1, wherein the request indicating the failover event is one of: a hot unplug request, an operation failure report, or a terminate request.

5. The method of claim 1, wherein preventing access to the assigned device by the guest operating system comprises updating a data structure with instructions to forward requests for the assigned device to the emulated device.

6. The method of claim 1 further comprising:
deactivating the device driver for the backend physical device;
exposing the assigned device to the guest operating system; and
providing a request to the guest operating system indicating a second failover event, the second failover event involving a switch from the emulated device to the assigned device.

7. The method of claim 1 further comprising initiating, by the processor executing the hypervisor, a migration of the virtual machine and the emulated device from the source computer system to a destination computer system.

8. The method of claim 1 wherein the request indicating the failover event is transmitted to initiate a VM migration or VM resource overcommit.

9. The method of claim 1, wherein the guest operating system comprises a generic driver for the emulated device.

10. A system, comprising:
a host machine comprising:
a memory to store instructions for a hypervisor; and
a processor, operatively coupled to the memory, to execute the hypervisor and the instructions, the processor to:
identify an assigned device assigned to a guest operating system of a virtual machine;
detect that the virtual machine does not include an emulated device;
instruct the virtual machine to add the emulated device;
notify the guest operating system that the emulated device is available as a failover for the assigned device;
transmit a request indicating a failover event, the failover event involving a switch from the assigned device to the emulated device, wherein the assigned device and the emulated device share a backend physical device;
receive an access request for the emulated device before the switch from the assigned device to the emulated device is completed;
hold the access request until the switch from the assigned device to the emulated device is completed;
receive an acknowledgement message from the guest operating system that the guest operating system is ready to initiate a failover and switch from the assigned device to the emulated device;
prevent access to the assigned device by the guest operating system;
transmit the access request held by the processor to the emulated device in response to a determination that the switch is completed and that the guest operating system is ready to use the emulated device;
associate a device driver for the emulated device in the hypervisor with the backend physical device; and
provide a notification to the guest operating system that the emulated device is available for use.

11. The system of claim 10, wherein when assigning the device to the guest operating system, the processor to permit the guest operating system to directly access the backend physical device.

12. The system of claim 10, wherein the processor is further to create a failover relationship between the assigned device and the emulated device, wherein the assigned device is to failover to the emulated device.

13. The system of claim 10, wherein the request indicating the failover event is one of: a hot unplug request, an operation failure report, or a terminate request.

14. The system of claim 10, wherein the processor is further to enable a memory overcommit for the emulated device.

15. The system of claim 10, wherein the guest operating system comprises a generic driver for the emulated device.

16. The system of claim 10 further comprising a destination machine, wherein the destination machine comprises a destination virtual machine comprising a destination guest operating system, and a destination backend physical device, wherein the processor is further to:
initiate a migration of the virtual machine and the emulated device from the host machine to the destination virtual machine of the destination machine.

17. The system of claim 16, wherein the destination machine further comprises a destination hypervisor to instruct the destination guest operating system to switch from the emulated device to a destination assigned device.

18. A non-transitory computer readable storage medium comprising instructions that, when executed by a processor, cause the processor to:
identify an assigned device assigned to a guest operating system of a virtual machine running on a computer system;
detect that the virtual machine does not include an emulated device;
instruct the virtual machine to add the emulated device;
notify the guest operating system that the emulated device is available as a failover for the assigned device;
transmit, by the processor executing a hypervisor to the guest operating system, a request indicating a failover event, the failover event involving a switch from the assigned device to the emulated device, wherein the assigned device and the emulated device share a backend physical device;
receive an access request for the emulated device before the switch from the assigned device to the emulated device is completed;
hold the access request until the switch from the assigned device to the emulated device is completed;
receive an acknowledgement message from the guest operating system that the guest operating system is ready to initiate a failover and switch from the assigned device to the emulated device;
prevent access to the assigned device by the guest operating system;
transmit the access request held by the processor executing the hypervisor to the emulated device in response to a determination that the switch is completed and that the guest operating system is ready to use the emulated device;

associate a device driver of the hypervisor with the backend physical device associated with the emulated device; and provide a notification to the guest operating system that the emulated device is available for use.

19. The non-transitory computer readable storage medium of claim 18, including further instructions that, when executed by the processor, cause the processor to define the failover relationship between the assigned device and the emulated device, wherein the assigned device is to failover to the emulated device.

* * * * *